United States Patent [19]

Rousseau

[11] Patent Number: 4,607,811

[45] Date of Patent: Aug. 26, 1986

[54] PROPULSION UNIT FOR HANG GLIDER TYPE AIRCRAFT, AND AIRCRAFT FITTED WITH THE PROPULSION UNIT

[76] Inventor: Yves J. Rousseau, La Gironie, 493300 Etriche, France

[21] Appl. No.: 655,204

[22] Filed: Sep. 26, 1984

[51] Int. Cl.[4] ............................................. B64C 17/00
[52] U.S. Cl. ........................................ 244/13; 244/54; 244/93; 244/63; 244/DIG. 14
[58] Field of Search ............ 244/DIG. 1.1, DIG. 1.5, 244/DIG 1.4, 93, 63, 54, 55, 65, 13

[56] References Cited

U.S. PATENT DOCUMENTS

| | | | |
|---|---|---|---|
| 1,151,172 | 8/1915 | Gage | 244/93 |
| 2,198,475 | 4/1940 | Dorner | 244/65 |
| 3,437,285 | 4/1969 | Manfredi et al. | 244/63 |
| 4,262,863 | 4/1981 | Slusarczyk | 244/DIG. 1 |

FOREIGN PATENT DOCUMENTS

| | | | |
|---|---|---|---|
| 3046430 | 7/1982 | Fed. Rep. of Germany | 244/DIG. 1 |
| 1270654 | 7/1961 | France | 244/DIG. 1 |

Primary Examiner—Galen Barefoot
Attorney, Agent, or Firm—Guy W. Shoup

[57] ABSTRACT

An aircraft of the hang glider type includes a wing (11) with a keel (12) in its plane of symmetry serving as a fastening point for a trapeze and a harness by which the pilot is suspended below the wing, the trapeze and the harness being disposed in conventional manner for suspending a pilot in the prone position. The invention provides a motor propeller unit (15) which is mounted in such a manner as to be movable at least in the longitudinal direction along the keel axis under pilot control, thereby enabling the pilot to displace both the center of gravity of the motor propeller unit and his own center of gravity between an extreme forward position ahead of the center of lift of the wing and an extreme rearward position behind the center of lift (1).

7 Claims, 16 Drawing Figures

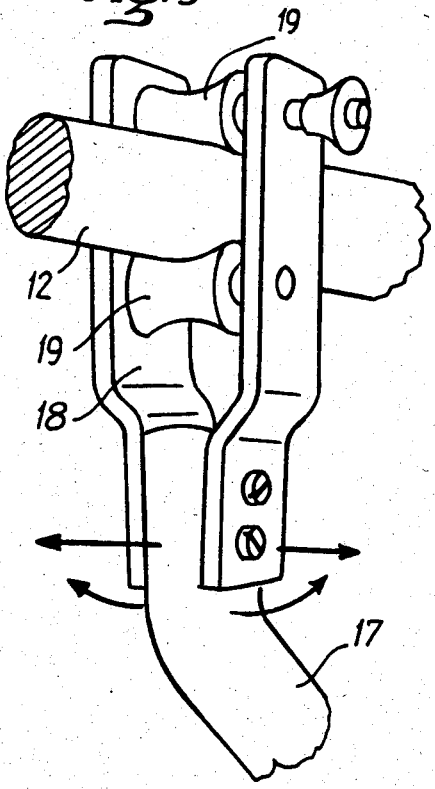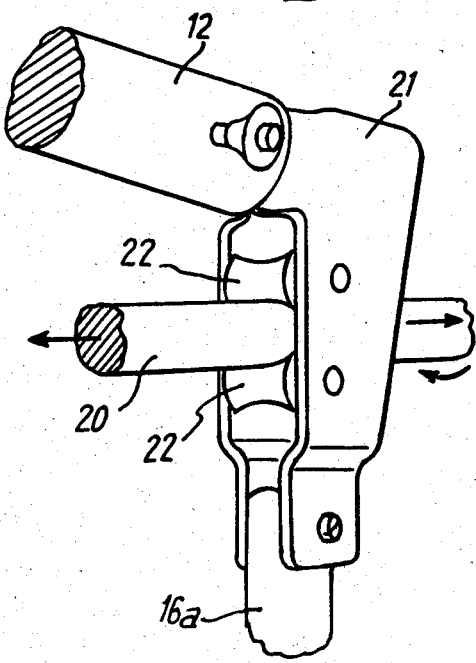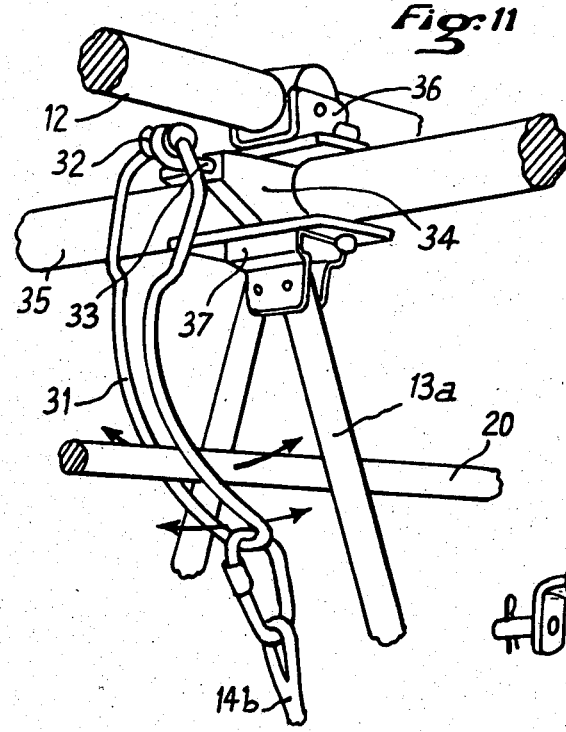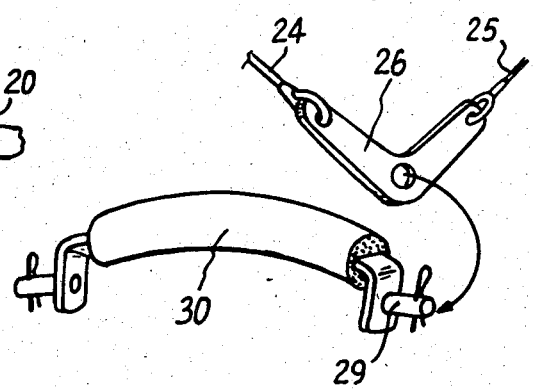

PROPULSION UNIT FOR HANG GLIDER TYPE AIRCRAFT, AND AIRCRAFT FITTED WITH THE PROPULSION UNIT

The present invention relates to a propulsion unit for aircraft, and in particular for hang glider type aircraft.

BACKGROUND OF THE INVENTION

Before embarking on the main features of the invention proper, it is appropriate to recapitulate the difficulties encountered when adapting motors, eg. internal combustion engines, to hang glider type aircraft, and also the difficulties encountered at take off and during various stages of flight.

Hang gliders have already been fitted with wheeled frames constituting a kind of nacelle for supporting a person suspended from the neutral point of the wing. The user is seated in the nacelle which generally includes an internal combustion engine fixed behind the user. The motor and frame assembly ensures good "hanging" type piloting conditions.

However, there are several drawbacks associated with this type of aircraft that have limited its development. Firstly the motorized nacelle is bulky and presents transport problems which detract from the feature of easy transport associated with the non-motorized hang glider.

The weight of the nacelle is also a serious functional drawback since it requires the motor to operate continuously to keep flying. If the motor stops, the sink rate is high.

Generally speaking such nacelles are bare frames without any kind of streamlining, so another functional drawback is the high aerodynamic drag of the nacelle together with the seated pilot and the motor. To mitigate these drawbacks, it is tempting to increase both the wing area and the motor power of the aircraft. Under such conditions, the motorized hang glider ceases to be a very light and maneuverable aircraft suitable for gliding sport.

Other means have also been devised to motorized a hang glider without resorting to a wheeled nacelle. For example the motor propeller unit may be fixed under the keel of the wing in one of two positions relative to the center of gravity: a first position in which the motor is behind the center of gravity with the propeller in front, thus constituting a puller system; and a second position in which the motor is in front of the center of gravity with the propeller behind, thus constituting a pusher system.

These types of solution give rise to weight and drag penalties which are acceptable in comparison with the hanging nacelle: the pilot can now be in a prone position hanging from the wing by means of a harness.

Unfortunately, mounting the power unit on the keel of the wing gives rise to piloting difficulties which may be dangerous since by definition a hang glider is controlled in flight by the pilot moving bodily relative to the wing's center of lift. The weight of the fixed motor reduces the effect of the pilot's movements and makes control of the aircraft in flight a chancy undertaking. The acrobatic capacity of the wing is thus likewise considerably reduced by the presence of the fixed motor.

A third system consists in strapping the motor to the pilot's back. In this case the combined pilot plus motor weight increases the effects of pilot body movement on aircraft control, but adds very considerably to the danger in the event of a crash. Also the drag is very considerably increased due to the fact that the pilot must remain in an upright position during flight. Another difficulty stems from the fact that take off is possible only from a suitable slope.

Indeed motorized take off is also difficult with a fixed propulsion unit, except in the case of the wheeled nacelle or cart, but in that case the drag and the weight of the nacelle considerably restrict the acrobatic performance of the motorized hang glider once airborne.

Preferred embodiments of the present invention mitigate the various drawbacks mentioned above by providing a propulsion unit which is adaptable to a hang glider type of aircraft and which enables it to be piloted in safety without modifying the initial flying characteristics of the hang glider.

Additionally, such preferred embodiments of the invention are not carried by the pilot, are easy to use at take off, even from flat ground without a near by slope, are capable of taking the aircraft up to a desired height; and may then be turned off for genuine gliding flight with minimum pilot drag.

SUMMARY OF THE INVENTION

The present invention provides a propulsion unit for an aircraft of the hang glider type including a wing with a keel in its plane of symmetry serving as a fastening point for a trapeze and a harness by which the pilot is suspended below the wing, the trapeze and the harness being disposed in conventional manner for suspending a pilot in the prone position, wherein the motor propeller unit is mounted in such a manner as to be movable at least in the longitudinal direction along the keel axis under pilot control thereby enabling the pilot to displace both the center of gravity of the motor propeller unit and his own center of gravity between an extreme forward position ahead of the center of lift of the wing and an extreme rearward position behind the center of lift.

This arrangement, together with various secondary features, enables the center of gravity of the motor propeller unit to be displaced in conjunction with the center of gravity of the pilot in a manner which avoids the motor propeller unit mass from acting as a dead weight and indeed transforms said mass into an easily controlled extension to the pilot's own weight during such maneuvers as take off, level flight, diving, and banking. Appropriate displacements of the motor propeller unit enhance the pilot's normal hang glider control movements.

The motor propeller unit may include an internal combustion engine situated in the front half of the wing and suspended in such a manner as to be free to move both axially and laterally relative to the keel of the wing, a drive shaft extending along the keel, and a pusher propeller fitted at an end of the drive shaft projecting beyond the rear of the keel, the pusher propeller preferably having folding propeller blades.

Longitudinal displacements of the motor propeller unit relative to the wing keel are preferably obtained by means of two traction cables having a common fastening point on the belt of the pilot harness, one of said cables being attached to the forward end of the motor propeller unit and the other cable being attached to the rear end thereof.

BRIEF DESCRIPTION OF THE DRAWINGS

An embodiment of the invention is described by way of example with reference to the accompanying drawings, in which:

FIG. 9 is a perspective view showing a detail of the moving fastening enabling the motor to be suspended from the keel of the wing;

FIG. 10 is a perspective view of the stationary fastening of the moving protective sheath for the propeller shaft;

FIG. 11 is a perspective view showing a detail of the link by which the pilot harness is fixed to the wing;

FIG. 12 is a perspective view of a detail of the coupling for transmitting longitudinal movements from the pilot harness to the motor unit;

MORE DETAILED DESCRIPTION

Figure 1:
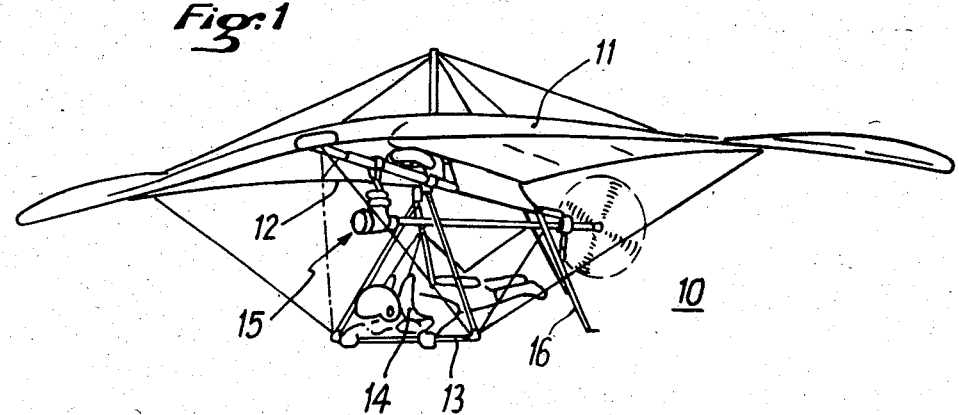
FIG. 1 is a perspective view of a hang glider fitted with a propulsion unit in accordance with the invention.

In FIG. 1, the general reference 10 designates a hang glider type of aircraft comprising a wing 11 and a rigid keel 12 serving as a fastening point for a trapeze 13 and for a pilot harness 14. The aircraft also includes a motor propeller unit 15 capable of being displaced along the axis of the keel under the control of the pilot, and also capable of being displaced to one or other side of the longitudinal axis of the keel 12.

Reference is made to FIGS. 7 to 12 when describing the structural details used to enable the motor propeller unit to perform such displacements relative to the wing.

Diagrammatic FIGS. 2 to 6 and 13 to 16 show flying conditions and take off conditions respectively as affected by the various positions which the motor propeller unit can take up, in particular relative to the center of lift of the wing.

Figure 7:
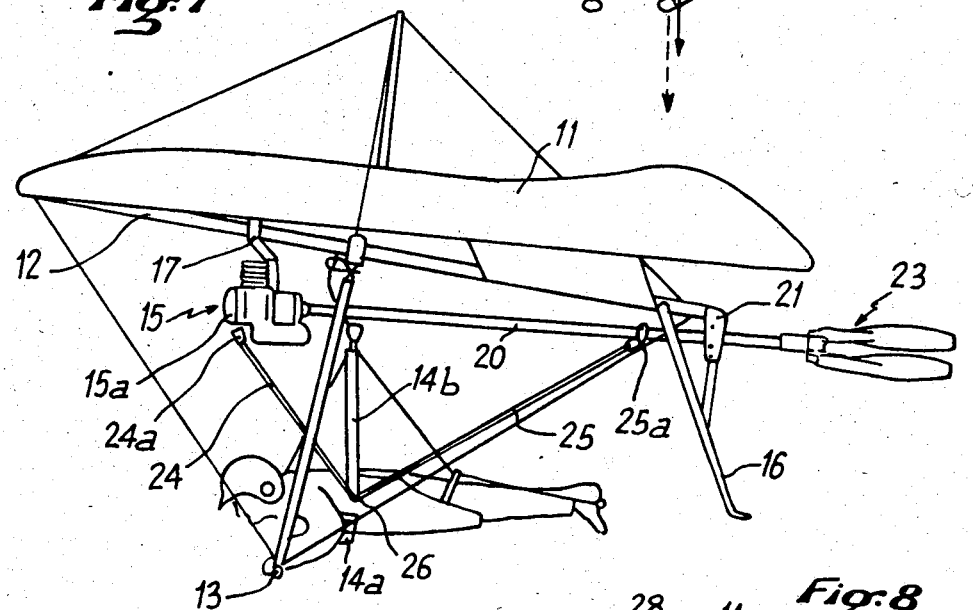
FIG. 7 is a side view showing the links for controlling combined pilot and motor displacement.

Thus, as shown in FIG. 7 the motor propeller unit 15 comprises an internal combustion engine 15a situated under the front half of the wing 11 and suspended from the keel 12 by a rod 17 and a shackle 18 having two centrally necked bobbins 19 extending between its arms running along diametrically opposite surfaces of the keel 12. The shape of the bobbins not only allows the shackle to run either way along the keel, but also allows it to swivel about the keel axis, thus off setting the motor sideways.

The motor 15a has a drive shaft 20 which is advantageously protected by a guide tube or sheath, and which extends to the rear of the aircraft to a pusher propeller 23. The rear end of the drive shaft is guided by a fixed bearing 21 which is shown in greater detail in FIG. 10. The fixed bearing 21 is in the general form of a shackle having a pair of centrally necked bobbins 22 enabling the protective sheath of the drive shaft to slide freely in an axial direction and also to rotate about the axis. The bearing 21 is fixed to the rear end of the keel 12 and to a strut 16a which reinforces a tail skid 16.

The propeller 23 fitted to the rear end of the drive shaft 20 is preferably fitting with folding propeller blades.

The entire motor propeller unit 15 is moved longitudinally relative to the keel 12 by means of cable links 24 and 25. Each of the cable links 24 and 25 may be made up from two strands. The cables 24 and 25 extend in opposite directions from a common bell crank shaped coupling member 26 (see FIG. 12) for coupling to the belt 14a of the pilot harness. The front cable 24 has its other end 24a connected to the motor 15a while the rear cable 25 has its other end 25a connected to the drive shaft's protective tube 20. It is thus easy to see that if the pilot moves forwardly, the motor propeller unit will likewise move forwardly, and that if the pilot moves rearwardly, the motor propeller unit will move rearwardly.

Figure 8:
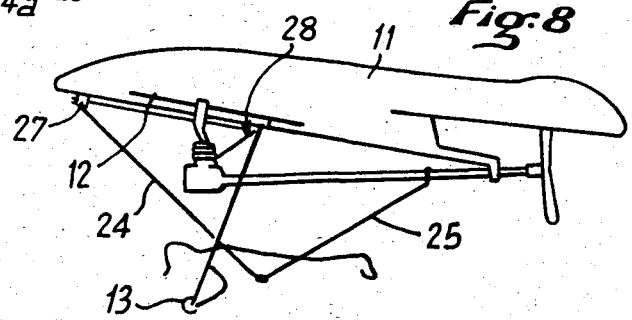
FIG. 8 is a diagrammatic side view showing variant control link.

In a variant shown in FIG. 8 the cable 24 may be sheaved round two pulleys 27 and 28 with the pulley 27 disposed at the leading end of the keel 12 and with the pulley 28 disposed close to the point from which the trapeze 13 is suspended from the same keel 12.

With reference to FIG. 12, it can be seen that the bell crank shaped coupling member 26 is pivoted about a stub axle 29 at one end of a C-shaped member 30 mounted on the harness belt 14a.

The harness has suspension straps 14b which are themselves suspended from an oblong hanger having two arms on either side of the motor unit's protective tube around the drive shaft 20. The hanger 31 is fixed to an anchor point located at the cross over between the keel 12 and transversal wing members 35. The anchor point is articulated about two perpendicular axes 32 and 33 located at the end of a short arm 34 jutting forward from the said cross over. The rear end of the arm 34 is fixed to upper and lower plates 36 and 37 which are clamped around the transversal wing members 35. The upper plate 36 has the keel 12 fixed thereto and the lower plate 37 has the side arms 13a of the trapeze 13 fixed thereto.

Figure 2:
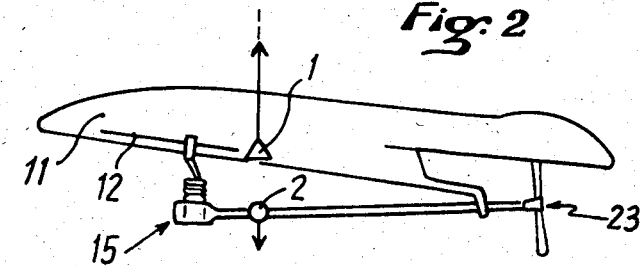
FIG. 2 is a diagrammatic side view of the powered hang glider during stable level flight.
Figure 3:
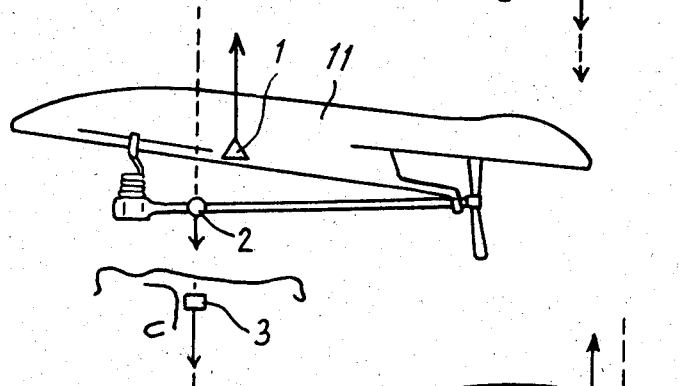
FIG. 3 is a diagrammatic side view showing the center of gravity off centered forwardly.

In level flight, as shown in FIG. 2, the pilot brings the center of lift of the wing 1 into vertical coincidence with his center of gravity 2 and the center of gravity 3 of the motor propeller unit. By definition this is an equilibrium flight configuration. In FIG. 3, the pilot has moved the center of gravity 2 of the motor propeller unit ahead of the center of lift 1 of the wing by a corresponding forward movement of his own body to take up a position suitable for loosing height and gaining speed and then pulling up again.

Figure 4:
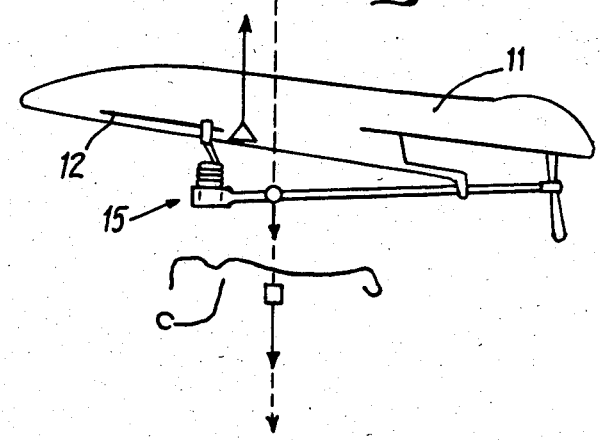
FIG. 4 is a diagrammatic side view showing the center of gravity off centered rearwardly.

In FIG. 4 the pilot has moved the center of gravity 2 of the motor propeller unit and also his own center of gravity 3 behind the center of lift 1, thereby reducing speed and increasing incidence.

Figure 5:
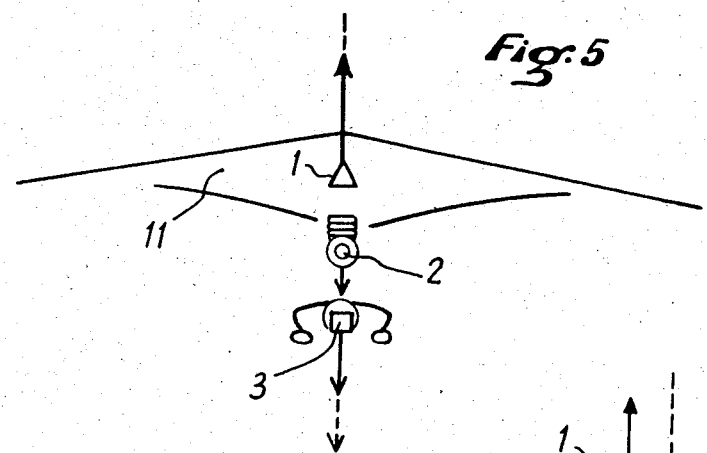
FIG. 5 is a diagrammatic front view of the powered hang glider during stable level flight as in FIG. 2.
Figure 6:
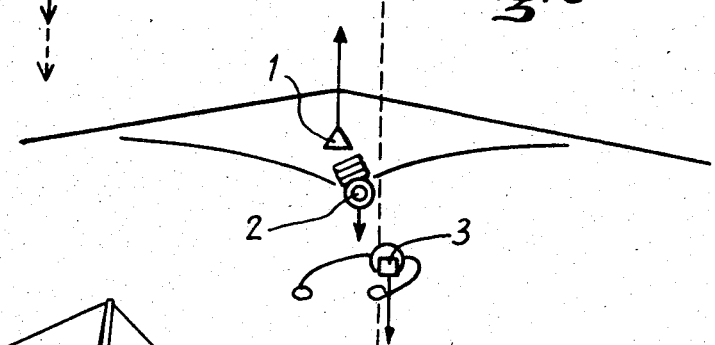
FIG. 6 is a diagrammatic front view showing the center of gravity off centered to the left of the powered glider.

FIG. 5 is a head-on view showing the centers of gravity 2 and 3 directly beneath the center of lift 1 as seen from in front. FIG. 6 shows that sideways displacement of the pilot causes a corresponding sideways displacement of the motor propeller unit relative to the center of lift 1, thereby causing the aircraft to bank and thus to turn, or else simply serving to counter the effect of unwanted roll.

Figure 13:
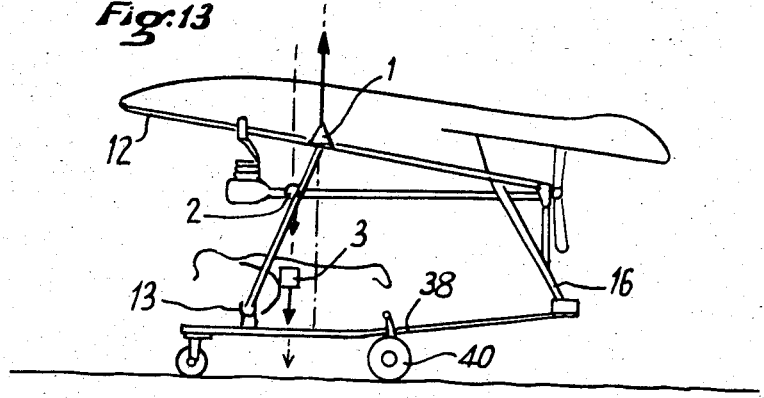
FIG. 13 is a side view of a hang glider fitted on a releasable launching trolley.

FIGS. 13 to 16 show the aircraft taking off from a releasable tricycle launch trolley 38. In FIG. 13 the center of gravity 3 of the pilot and 2 of the motor propeller unit are displaced ahead of the center of lift 1 thereby enabling the aircraft to get up to take off speed while maintaining the wing at neutral incidence.

Figure 14:
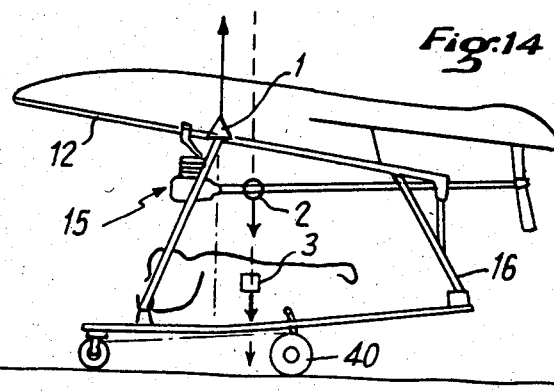
FIG. 14 is a side view showing a position of reduced weight on the trolley front wheel.

In FIG. 14 the center of gravity 2 of the motor propeller unit 15 and the center of gravity 3 of the pilot are displaced together rearwardly to a point behind the center of lift 1 thereby setting up suitable incidence for take off.

Figure 15:
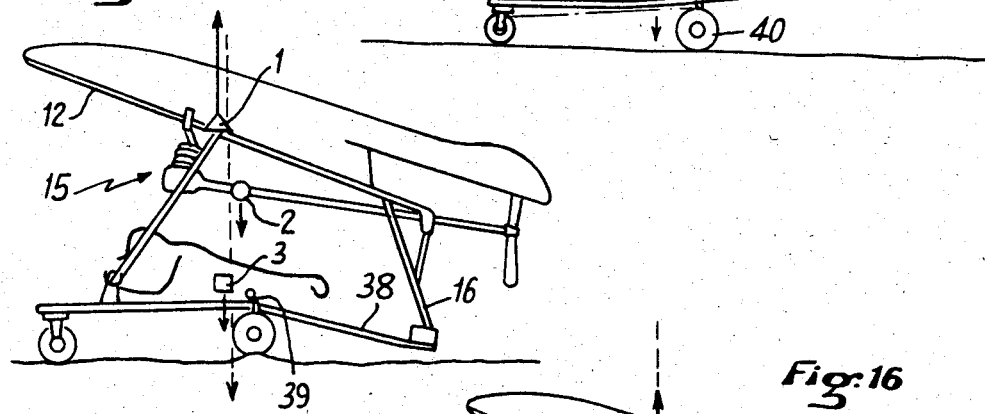
FIG. 15 is a side view showing a nose up immediately prior to take off.

FIG. 15 shows how this results in the nose wheel of the trolley becoming unloaded with the wing on the point of becoming airborne.

Figure 16:
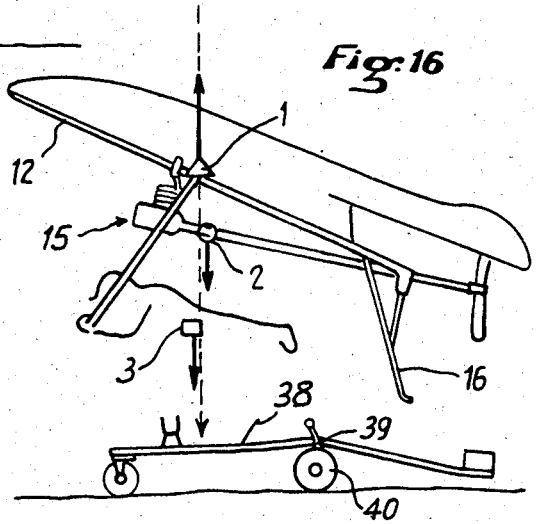
FIG. 16 is a side view showing the hang glider immediately after separation from the launch trolley.

FIG. 16 shows the aircraft just after becoming airborne.

The trolley 38 shown in FIGS. 13 to 16 is preferably hinged at 39 just above the rear wheels 40 thereof. When the front wheel becomes unloaded shortly before the aircraft becomes airborne, the trolley is in danger of tilting nose up like the aircraft. By hingeing the rear portion of the trolley which supports the tail skid, the aircraft can tilt to a nose up position while leaving all three wheels of the trolley in contact with the ground, the trolley nose wheel remaining in contact under the effect of the weight of the trolley only.

I claim:

1. A propulsion unit for an aircraft of the hang glider type including a wing with a keel in its plane of symmetry serving as a fastening point for a trapeze and a harness by which the pilot is suspended below the wing, the trapeze and the harness being disposed in conventional manner for suspending a pilot in the prone position, wherein the motor propeller unit is mounted in such a manner as to be movable at least in the longitudinal direction along the keel axis under pilot control thereby enabling the pilot to displace separately both the center of gravity of the motor propeller unit and his own center of gravity between an extreme forward position ahead of the center of lift of the wing and an extreme rearward position behind the center of lift.

2. A propulsion unit according to claim 1, wherein the motor propeller unit includes an internal combustion engine situated in the front half of the wing and suspended in such a manner as to be free to move both axially and laterally relative to the keel of the wing, a drive shaft extending along the keel and being fitted at an end projecting beyond the rear of the keel with a pusher propeller.

3. A propulsion unit for an aircraft of the hang glider type including a wing with a keel in its plane of symmetry serving as a fastening point for a trapeze and a harness by which the pilot is suspended below the wing, the trapeze and the harness being disposed in conventional manner for suspending a pilot in the prone position, wherein the motor propeller unit is mounted in such a manner as to be movable at least in the longitudinal direction along the keel axis under pilot control thereby enabling the pilot to displace both the center of gravity of the motor propeller unit and his own center of gravity between an extreme forward position ahead of the center of lift of the wing and an extreme rearward position behind the center of lift, wherein the longitudinal displacements of the unit relative to the wing keel are obtained by means of two traction cables having a common fastening point on the belt of the pilot harness, one of said cables being attached to the forward end of the motor propeller unit and the other cable being attached to the rear end thereof.

4. A propulsion unit for an aircraft of the hang glider type including a wing with a keel in its plane of symmetry serving as a fastening point for a trapeze and a harness by which the pilot is suspended below the wing, the trapeze and the harness being disposed in conventional manner for suspending a pilot in the prone position, wherein the motor propeller unit is mounted in such a manner as to be movable at least in the longitudinal direction along the keel axis under pilot control thereby enabling the pilot to displace both the center of gravity of the motor propeller unit and his own center of gravity between an extreme forward position ahead of the center of lift of the wing and an extreme rearward position behind the center of lift, wherein the pilot harness includes suspension straps suspended from a hanger which includes first and second branches placed astride the propeller drive shaft, thereby enabling the motor propeller unit to be displaced sideways by sideways displacements of the pilot, said hanger being itself suspended from an anchor point which is fixed to the keel of the wing and which is articulated about two perpendicular pivot axes.

5. A propulsion unit for an aircraft of the hang glider type including a wing, and comprising a motor propeller unit mounted for movement with respect to the wing, and a harness for suspending the pilot below the wing, said harness including flexible cable means coupling the pilot to the motor propeller unit and to said wing for permitting said pilot, by suitable adjustment of his position, to vary the positional relationships of motor propeller unit and wing and pilot, one to each other.

6. A propulsion unit according to claim 5, wherein said motor propeller unit is movable along a longitudinal keel axis of said aircraft.

7. A propulsion unit according to claim 6, wherein said motor propeller unit is movable laterally with respect to said longitudinal keel axis.

* * * * *